Figure 1:
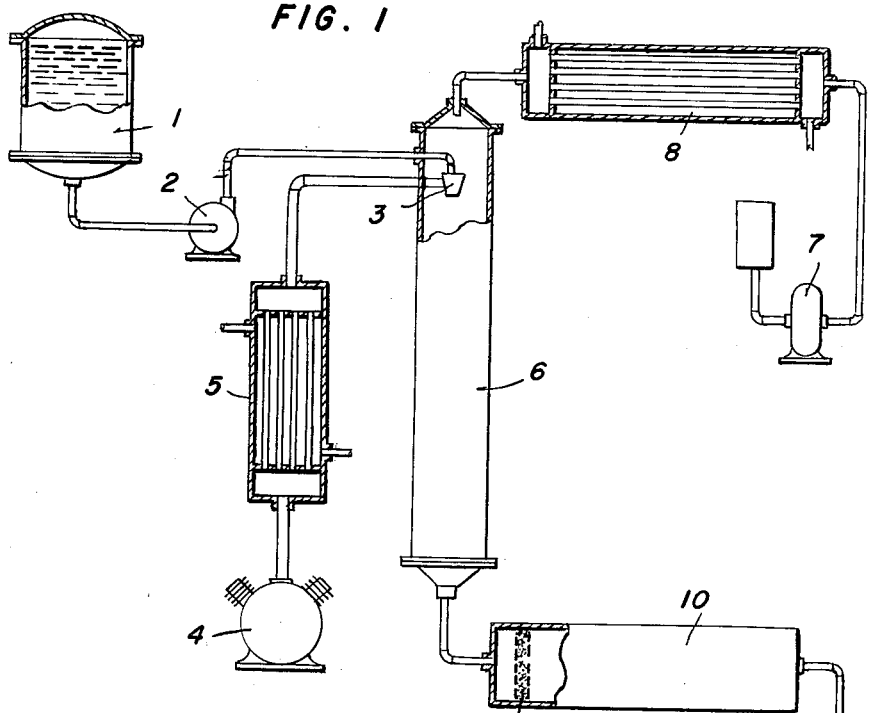

Nov. 6, 1962 GUSTAV-ADOLF GROSS 3,062,842
PROCESS AND APPARATUS FOR THE OXIDATION OF
ANTHRACENE TO ANTHRAQUINONE
Filed April 19, 1957 2 Sheets-Sheet 1

INVENTOR
GUSTAV- ADOLF GROSS

BY Wendroth, Lind & Ponack

ATTORNEYS

Nov. 6, 1962

GUSTAV-ADOLF GROSS 3,062,842

PROCESS AND APPARATUS FOR THE OXIDATION OF
ANTHRACENE TO ANTHRAQUINONE

Filed April 19, 1957

2 Sheets-Sheet 2

INVENTOR
GUSTAV-ADOLF GROSS

BY
Wenderoth, Lind & Ponack
ATTORNEYS

3,062,842
Patented Nov. 6, 1962

3,062,842
PROCESS AND APPARATUS FOR THE OXIDATION OF ANTHRACENE TO ANTHRAQUINONE
Gustav-Adolf Gross, Basel, Switzerland, assignor to Ciba Limited, Basel, Switzerland
Filed Apr. 19, 1957, Ser. No. 653,836
Claims priority, application Switzerland Apr. 19, 1956
9 Claims. (Cl. 260—385)

It is known that anthraquinone can be made by the catalytic oxidation of anthracene by passing a mixture of anthracene vapor and air over a suitable vanadium catalyst.

The mixture of anthracene vapor and air has been hitherto produced, for example, by passing a portion of a preheated air stream through a sublimation vessel charged with anthracene, mixing the hot air saturated with anthracene vapor with the main air stream, and passing the mixture into the contact furnace.

In this process frequent and considerable variations in the composition of the anthracene vapor-air mixture occur. This has lead to detonations in the catalysis plant when the critical lower explosion limit of the gaseous mixture, which is 38–40 grams of anthracene per cubic meter of air (normal conditions), has been accidentally exceeded, so that the manufacture of anthraquinone by the catalytic oxidation of anthracene has not been adopted by industry.

An object of the present invention is to provide a process for the catalytic oxidation of anthracene to anthraquinone in which a mixture of anthracene vapor and air of substantially constant composition is used, so that the critical explosion limit of the gaseous mixture is not exceeded.

A further object of the invention is to provide a process of the above kind in which an industrial anthracene that has not been specially purified is used for preparing the mixture of anthracene vapor and air.

In the process of this invention molten anthracene is atomized to form a liquid mist, the liquid mist is then rapidly vaporized, and the resulting anthracene vapor is mixed with a stream of a hot gas containing oxygen, the supply of the liquid anthracene to be atomized and the supply of the hot oxygen-containing gas being so adjusted relatively to one another that the composition of the gaseous mixture so obtained does not exceed the critical explosion limit.

When there is used for atomization an industrial anthracene that has not been previously purified by sublimation, and which usually contains 0.25–0.5% of sparingly volatile so-called sublimation residues, care must be taken that these sparingly volatile constituents do not accumulate in the plant as this may lead to the outbreak of fires or to contamination of the end product by the formation of ash.

This is prevented in accordance with the present invention by removing the sublimation residues that remain suspended in the vapor after evaporation of the anthracene before the mixture of anthracene vapor and oxygen-containing gas is passed into the contact furnace.

The catalytic oxidation of the resulting mixture of anthracene vapor and oxygen-containing gas is advantageously carried out by means of an alkaline vanadium oxide catalyst such as is described in application Serial No. 421,159, filed April 5, 1954, by Albert Wettstein. Air is generally used as the oxygen-containing gas. The atomization of the liquid anthracene is advantageously carried out in an aerodynamic manner with the aid of a hot stream of compressed gas or on the scent spray principle, in which liquid drops issuing from a pipe are broken up by a stream of compressed air into a fine mist of droplets. It is preferable to use constructions of nozzle which operate at high gas velocities so as to produce a very fine liquid mist.

The atomization may be carried out with compressed air directly into a mixing chamber into which a stream of hot oxygen-containing gas, such as hot air, is simultaneously introduced. In this manner the vaporization of the anthracene mist and its admixture with hot air are brought about in a single operation.

It may, however, be of advantage to atomise the liquid anthracene with the aid of a compressed inert gas, such as superheated steam, nitrogen or an industrial mixture of nitrogen and carbon dioxide, and then to mix the anthracene vapor in the inert carrier gas with the oxygen-containing gas or hot air only shortly before the mixture is passed into the contact furnace. This has the advantage that the anthracene vapor is in contact with an oxidizing atmosphere outside the contact furnace only for a very short time, which enables the catalytic oxidation to be better controlled.

As stated above, when molten industrial anthracene is atomized directly, care must be taken that the sparingly volatile sublimation residues are removed by means of a filter before the gaseous mixture enters the contact furnace. The filter may consist of a layer of porcelain fragments, Raschig rings, a layer of glass wool or advantageously sintered metal, or ceramic, which may be arranged, for example, so that the gas stream passes it before reacting the first layer of catalyst in the contact furnace.

When the atomization and vaporization of the anthracene is carried out in an inert gas, for example, in superheated steam, the filter may be arranged in a part of the plant through which only anthracene vapor and inert gas flow, so that oxidative degradation of the sublimation residues and consequent ash formation are avoided. At the same time the risk is reduced of detonations which are liable to occur when pyrophoric impurities from the anthracene used come into contact with the air stream used for oxidation.

Figure 2:
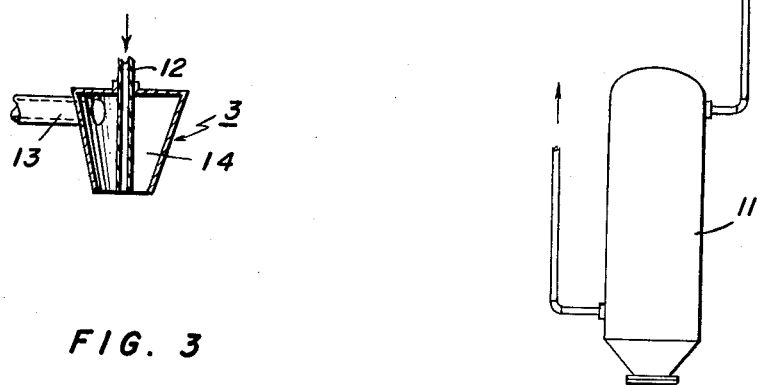
Figure 3:
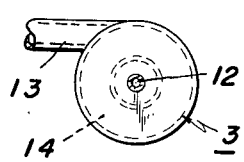
Figure 4:
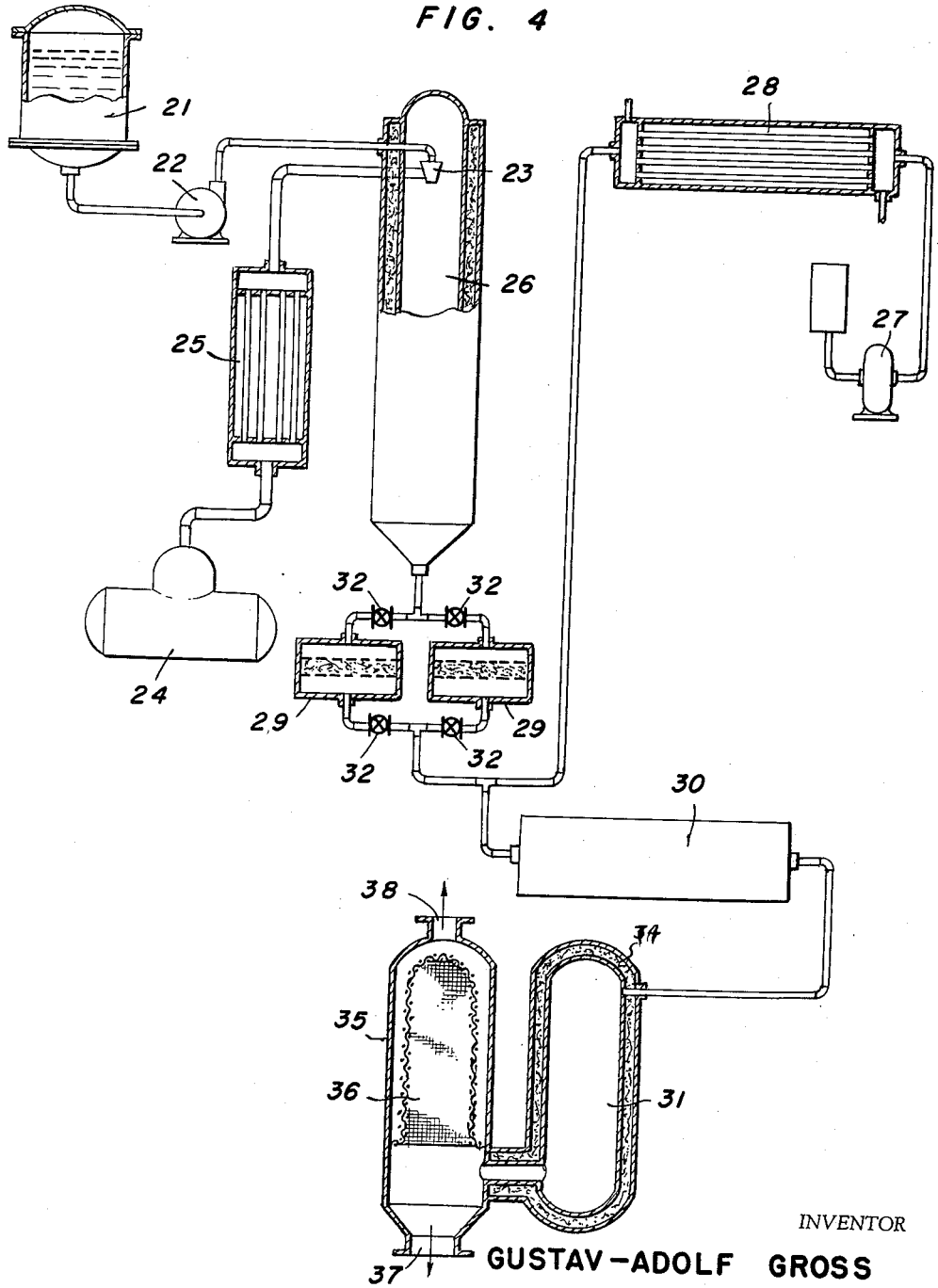

The process of the invention is illustrated with reference to the accompanying drawings, in which
FIGURE 1 is a flow diagram of a plant for carrying out the process,
FIGURE 2 shows in cross-section a nozzle suitable for atomizing liquid anthracene,
FIGURE 3 is a plan view of a nozzle shown in FIGURE 2, and
FIGURE 4 shows a modification of the plant shown in FIGURE 1 for the use of superheated steam as the inert gas.

As shown in FIGURE 1 a vessel 1 contains molten anthracene which has been heated to a temperature of 230–260° C., and which is pumped by means of a regulatable feed pump to an atomizing nozzle 3. Furthermore a current of compressed air passes through nozzle 3 and is compressed in an air compressor 4, to e.g. 1–1.5 atmospheres gauge pressure and is heated in an air heater 5 to 300° C.–400° C. The nozzle 3 is arranged in the upper part of an evaporation and mixing chamber 6 into which is also introduced a stream of hot air, which is supplied by means of a blower 7 and which is heated in an air heater 8 to 300–400° C.

The liquid anthracene which is atomized in the nozzle 3 to form a fine liquid mist mixes with the stream of hot air supplied by the blower 7, and is vaporized in passing through the chamber 6. The output of the pump 2 for the liquid anthracene and of the blower 7 for the stream of hot air are so adjusted relatively to one another that the composition of the mixture of anthracene vapor and air produced in the chamber 6 never exceeds the critical explosion limit.

The mixture of anthracene vapor and air so produced and in which small droplets of sublimation residues of the anthracene are suspended, is passed through a filter 9, for example, consisting of a bed of Raschig rings, into the contact furnace 10. Droplets of the residues or any fly ash formed are retained on the filter. In the contact furnace 10 there are arranged, for example, several layers of a suitable vanadium oxide catalyst arranged in series, through which the gaseous mixture passes, so that the anthracene vapor is oxidized to anthraquinone vapor. As the reaction is exothermic the temperature in the contact furnace is advantageously maintained within the range of 300°–400° C. by cooling elements inserted therein. The mixture of anthraquinone vapor and air issuing from the contact furnace is finally passed into a separator 11, in which the anthraquinone is condensed in solid form.

In FIGURES 2 and 3 the atomizing nozzle 3 is shown in cross-section on an enlarged scale. The liquid anthracene is supplied through a pipe 12, and compressed air is introduced laterally from a pipe 13 into a conical part 14 of the nozzle. Owing to the high velocity of the air at the mouth of the nozzle 14 and liquid drops issuing from the tube 12 are broken up into a fine liquid mist.

FIGURE 4 shows a modification of the plant illustrated in FIGURE 1, in which the anthracene is atomized by means of an inert gas, namely superheated steam. The anthracene is melted in a vessel 21 and is supplied by a pump 22 to the atomizing nozzle 23. The steam used as inert gas in generated in a boiler 24 and is heated to about 350–450° C. in a superheater 25. Atomization and vaporization take place in the atomizing chamber 26. After leaving the chamber 26 the mixture of anthracene vapor and steam passes through one of the filters 29, depending on the position of the valves 32 which are advantageously composed of sintered metal. Whichever of the filters is not in use can be cleaned. After leaving the filter the mixture of anthracene vapor and steam is mixed with a current of hot air, which is produced by a blower 27 and is heated to about 300–400° C. by means of an air heater 28. The relative proportions of the anthracene-steam mixture and the hot air are so adjusted by regulating the supply pump 22 and the blower 27 that the composition of the mixture of anthracene vapor, steam and air does not exceed the critical explosion limit.

The mixture then passes, as in the case of the apparatus shown in FIG. 1, to a contact furnace 30 in which the anthracene vapor is oxidized to anthraquinone vapor. The issuing mixture of anthraquinone and air passes into a separator 31.

As the latter mixture contains steam it is necessary to take special precautions to prevent the water condensing during the sublimation. For this purpose the sublimation vessel 31 is insulated, or it may even be heated, in order to prevent water precipitating on the walls of the vessel. A filter 35 is connected to the sublimation vessel 31. As shown in FIG. 4, a bag filter is used of which the bag 36 holds back the solid anthraquinone. The mixture of air and steam escapes at a temperature of about 100° C. through an upper outlet 38, and the dry anthraquinone can be discharged from the lower outlet 37. Instead of a bag filter an electrofilter may be used.

By the process described above it is possible to carry out the catalytic oxidation of a mixture of anthracene vapor and air on a large industrial scale with complete safety, that is to say, without the risk of explosions or fires occurring.

The use of an inert gas has the advantage that in the subsequent mixing with the oxygen-containing hot gas the critical explosion limit of the mixture is avoided with certainty.

The use of superheated steam is advantageous because steam is cheaper than other inert gases.

What is claimed is:
1. Process for the oxidation of anthracene to anthraquinone by the catalytic oxidation of anthracene vapor, comprising the steps of: atomizing molten anthracene, said anthracene being industrial anthracene that has not been previously purified by sublimation and which contains 0.25 to 0.5% of sparingly volatile sublimation residues, to form a liquid mist and rapidly vaporizing said liquid mist with the use of a hot inert gas, filtering the resulting anthracene vapor from non-gaseous impurities, mixing the filtered anthracene vapor with a stream of a hot gas containing oxygen, and adjusting relatively to one another the supply of molten anthracene and the supply of hot gas so that the gaseous mixture formed by the composition does not exceed the explosion limit.

2. A process as claimed in claim 1, wherein hot air is used as hot oxygen-containing gas.

3. A process as claimed in claim 1, wherein superheated steam is used as the hot inert gas.

4. Apparatus for the oxidation of anthracene to anthraquinone by the catalytic oxidation of anthracene vapor, which apparatus comprises an enclosed chamber, gas filter means for removing non-gaseous impurities, a heating means for producing hot oxygen-containing gas and a contact furnace; said enclosed chamber containing at one end an atomizing nozzle directed into said chamber and toward the filter means, two inlet conduits which pass through a wall of the chamber and which are operatively connected to the nozzle, and said chamber containing at the other end an outlet conduit; said contact furnace having an inlet conduit connected to the outlet conduit of the chamber; said heating means being provided with a controllable supply means and an outlet conduit which is connected to the outlet conduit of the chamber where said last-mentioned conduit is connected to the inlet conduit of the furnace; and said filter means being interposed between the nozzle and the point at which the chamber outlet conduit, the heating means outlet conduit and the furnace inlet conduit meet, whereby fluid flowing from the nozzle to said point must pass through a filter.

5. Apparatus according to claim 4 wherein the filter means consists of at least one porcelain filter.

6. Apparatus according to claim 4 wherein the filter means consists of at least one glass wool filter.

7. Apparatus according to claim 4 wherein the filter means consists of at least one sintered metal filter.

8. Apparatus according to claim 4 wheren the filter means consists of at least one ceramic filter.

9. Apparatus for the catalytic oxidation of anthracene vapor to anthraquinone, which apparatus comprises an enclosed chamber, gas filter means for removing non-gaseous impurities, a heating means for producing hot oxygen-containing gas and a catalyst contact furnace; said enclosed chamber containing at one end an atomizing nozzle directed into said chamber and toward the filter means, two inlet conduits which pass through a wall of the chamber and which are operatively connected to the nozzle, and said chamber containing at the other end an outlet conduit, said contact furnace having an inlet conduit connected to the outlet conduit of the chamber; said heating means being provided with a controllable supply means and an outlet conduit which is connected to the outlet conduit of the chamber where said last-mentioned conduit is connected to the inlet conduit of the furnace; and said filter means being interposed between the nozzle and catalyst in the contact furnace, whereby fluid flowing from the nozzle to the catalyst must pass through a filter.

References Cited in the file of this patent

UNITED STATES PATENTS

| | | |
|---|---|---|
| 1,849,833 | Jaeger et al. | Mar. 15, 1932 |
| 2,022,845 | De Rewal | Dec. 3, 1935 |
| 2,769,018 | West | Oct. 30, 1956 |